United States Patent
Guntermann et al.

(10) Patent No.: US 12,424,354 B2
(45) Date of Patent: Sep. 23, 2025

(54) FEED-THROUGH AND SEALING ARRANGEMENT

(71) Applicant: Hanon Systems, Daejeon (KR)

(72) Inventors: Bernd Guntermann, Lennestadt (DE); Senol Gecgel, Cologne (DE); Johannes Stausberg, Cologne (DE)

(73) Assignee: HANON SYSTEMS, Daejeon (KR)

( * ) Notice: Subject to any disclaimer, the term of this patent is extended or adjusted under 35 U.S.C. 154(b) by 168 days.

(21) Appl. No.: 18/248,421

(22) PCT Filed: May 4, 2022

(86) PCT No.: PCT/KR2022/006418
§ 371 (c)(1),
(2) Date: Apr. 10, 2023

(87) PCT Pub. No.: WO2022/240065
PCT Pub. Date: Nov. 17, 2022

(65) Prior Publication Data
US 2023/0377777 A1    Nov. 23, 2023

(51) Int. Cl.
*H01B 17/30* (2006.01)
*H02K 5/22* (2006.01)

(52) U.S. Cl.
CPC .......... *H01B 17/301* (2013.01); *H02K 5/225* (2013.01)

(58) Field of Classification Search
CPC ........ H01B 17/301; H02K 5/225; H02K 5/10; H01R 2201/10; H01R 13/521; H02G 15/04
USPC ............................................................ 174/93
See application file for complete search history.

(56) References Cited

U.S. PATENT DOCUMENTS

| | | | |
|---|---|---|---|
| 10,454,334 B2 | 10/2019 | Heo et al. | |
| 2019/0052144 A1* | 2/2019 | Heo | H02K 5/225 |
| 2020/0395807 A1 | 12/2020 | Heo et al. | |
| 2021/0075291 A1 | 3/2021 | Hagita et al. | |
| 2021/0099042 A1 | 4/2021 | Takayama et al. | |
| 2021/0344139 A1* | 11/2021 | Maegawa | F04B 39/123 |

FOREIGN PATENT DOCUMENTS

| | | |
|---|---|---|
| JP | 2019502857 A | 1/2019 |
| KR | 100543096 B1 | 1/2006 |
| KR | 102048544 B1 | 11/2019 |
| WO | 2021066428 A1 | 4/2021 |

* cited by examiner

*Primary Examiner* — Timothy J Thompson
*Assistant Examiner* — Paramita Ghosh
(74) *Attorney, Agent, or Firm* — Shumaker, Loop & Kendrick, LLP; James D. Miller (57) ABSTRACT

A feed-through and sealing arrangement of an electrical connection fed through a housing wall of an electric motor or another electric device, the feed-through and sealing arrangement including a terminal pin plate through which a terminal pin is fed, at least one feed-through opening, a sealing surface, and a combined sealing part. The at least one terminal pin cover is inserted into the at least one feed-through opening when feeding-through the terminal pin through the housing wall.

10 Claims, 5 Drawing Sheets

FEED-THROUGH AND SEALING ARRANGEMENT

CROSS REFERENCE TO RELATED PATENT APPLICATIONS

This is a U.S. national phase patent application of PCT/KR2022/006418 filed May 4, 2022 which claims the benefit of and priority to German Patent Application No. 10 2022 110 839.2 filed on May 3, 2022 and German Patent Application No. 10 2021 112 126.4 filed on May 10, 2021, the entire contents of each of which are incorporated herein by reference.

TECHNICAL FIELD

The invention relates to a feed-through and sealing arrangement of an electrical connection fed through a housing wall of an electric motor or another electric device.

BACKGROUND ART

Electric compressors for vehicle air-conditioning are the main field of application of the feed-through and sealing arrangement. A compressor for vehicle air-conditioning has a mechanical part filled with mainly gaseous refrigerant and oil and which is also referred to as a ¾ pump. This part should be sealed against an electronic part—the so-called inverter—in order to keep it free from any fluids and thus to avoid damage to the electrical components of the printed circuit board caused by refrigerant and/or oil. It should be considered that any contact of liquid with electrical components could result in a short circuit. Above all, however, it is important to avoid loss of refrigerant. The air-conditioning system has a service life filling. Loss of refrigerant may result in system failure and, additionally, is unacceptable for environmental reasons alone.

A glass-metal seal is mostly used as the standard for electrical feeding-through of terminal pins through a housing wall in a refrigerant compressor housing. It is sealed against the compressor and/or motor housing either by means of a metal bead seal or by an elastomer seal. A plastic sleeve or elastomer seals are used to electrically insulate the electrical connection against the refrigerant. In the compressor, open metal surfaces are covered by the elastomer or plastic sleeve to keep the internal insulation resistance high.

A corresponding feed-through and sealing arrangement of an electrical connection fed through a housing wall of a compressor comprises at least one terminal pin made of electrically conductive material, which is fed through a metal plate, which is also referred to as an E-pin plate and/or terminal pin plate. In the region of the metal plate and in the adjoining regions above and below the metal plate, the terminal pin is enclosed by a glass insulation, thereby implementing the aforementioned glass-metal seal. Such glass-metal seal is sealed against the compressor and/or motor housing by means of a plate seal, which is designed as a metal bead seal or an elastomer cord seal. The open metal surfaces of the terminal pin in the compressor are covered by means of a terminal pin cover, which is designed in the form of a cylindrical plastic sleeve and serves for electrical insulation against the refrigerant.

In order to ensure tightness in such a feed-through and sealing arrangement, straight and/or uniform compression of the sealing bead or the sealing cord is just as necessary as a clean support surface of the motor housing, because such support surface should be free of any impurities in order to ensure good sealing.

Here, the relatively high complexity is a disadvantage, since two or more components are required for sealing the terminal pin plate and for covering the terminal pins. This involves a high level of assembly work. In addition, this may result in formation of non-sealing regions. Moreover, the various components also have different expansion coefficients, which result in a different technical behavior in temperature resistance tests due to changing temperature loads. Thus, the metal plate for electrical feed-through is usually made of steel. The material for the metal pin cover is usually plastic or an elastomer. In contrast, the motor housing of the compressor is mostly made of aluminum. In particular, expansion and shrinkage of the seal at changing temperatures—in some test cycles with a maximum temperature of 125° C. and with −40° C. as the lowest temperature—stress the entire assembly of the electrical feed-through, which may result in reduction of the residual torque of the fastening screws, which may result in the fastening screws getting lost, which in the worst case may also result in leakage of refrigerant in the region of the electrical feed-through.

SUMMARY

The object of the invention is to reduce the number of components within the feed-through and sealing arrangement, to simplify assembly, and to make the electrical insulation safer against fluids such as refrigerant and oil.

This object is achieved by a feed-through and sealing arrangement having the features as shown and described herein.

The feed-through and sealing arrangement according to the invention of an electrical connection fed through a housing wall of an electric motor or another electric device comprises:
- a terminal pin plate in the form of a metal plate with at least one feed-through opening through which a terminal pin made of electrically conductive material is fed through and electrically insulated from the metal plate by a glass insulation extending through the feed-through opening and enclosing the terminal pin in the region of the feed-through opening,
- a plate support surface for the metal plate on the housing wall, a sealing surface on the housing wall surrounded by the plate support surface for the metal plate,
- at least one feed-through opening surrounded by the sealing surface for feed-through of the at least one terminal pin through the housing wall,
- a combined sealing part, in which a flat plate sealing region placed on the housing between the metal plate and the sealing surface and at least one terminal pin cover, which is designed in the form of a cylindrical plastic or elastomer sleeve having a frontal opening surrounded by the flat plate sealing region, are connected to each other, wherein the at least one terminal pin cover is inserted into the at least one feed-through opening of the housing wall when feeding-through the terminal pin through the housing wall.

Thus, in line with the concept, the object of the invention is achieved in that both sealing functions described above, namely the sealing of the terminal pin plate and the covering of the at least one terminal pin, are implemented by only one component, i.e. the combined sealing part. In other words, the sealing part combines the functions of an E-pin plate seal and an E-pin cover.

The correspondingly achieved reduced complexity results in reduced costs. In addition, the reduced complexity is also associated with considerable savings regarding assembly efforts. Moreover, the requirements with respect to creepage path, insulation resistance, cleanliness and prevention of deposition of dirt, particles and oil on the glass insulation can also be fulfilled thereby.

According to a particularly advantageous embodiment of the invention, the feed-through and sealing arrangement has three terminal pins and, for these terminal pins, three feed-through openings in the metal wall, three feed-through openings in the housing wall and a combined seal with three terminal pin covers. The latter means that also the seal of a three-phase connector can be designed as a combined sealing part connecting the terminal pin cover and the metal plate seal to one another.

According to a preferred embodiment of the invention, the outer edge of the flat plate sealing region has an oval shape. In this case, it is particularly advantageous when the plate support surface for the metal plate on the housing has an oval recess corresponding to the oval shape of the flat plate sealing region in the region surrounding the feed-through openings and forming a support surface for the flat plate sealing region of the combined sealing part.

Preferably, a circumferential sealing cord is additionally designed on the outer edge of the flat plate sealing region. In accordance with the aforementioned embodiments, the shape of an oval sealing ring is preferred, surrounding the flat plate sealing region as a circumferential sealing cord.

The combined sealing part consisting of an E-pin plate seal and an E-pin cover can be implemented both as a single-material component and as a dual-material component consisting of a soft component and a hard component. This variant is provided, in particular, when it is necessary to impart sufficient stability to the so-called concealer, i.e. a part of the cylindrical terminal pin cover, which is intended to be pushed over an electrical interface of the motor or electric device like a cap, so that the concealer can be pushed over the electrical interface (motor interface) without folding. A polyamide with glass fiber reinforcement is particularly suitable as material for the hard component. In particular, an elastomer such as, for example, ethylene propylene diene (monomer) rubber (EPDM) has proven advantageous as material for the soft component. The hard and soft components can be connected to one another by a bonded connection. Thus, hard and soft components can be adhesively bonded to one another, for example by an adhesive bond or by vulcanization.

In the case that there is no risk of folding of the concealer, the combined sealing part consisting of terminal pin plate seal and terminal pin cover may also be implemented as a single-material component, for example consisting only of an elastomer. The feed-through and sealing arrangement according to the invention allows for a simplified form of the terminal pin plate, which can be long and narrow. The deflection of the terminal pin plate by the internal pressure in the compressor can be compensated by the elastomer seal. Usually, two screws each in the region of the opposite ends of the long side of the terminal pin plate are sufficient for fastening them to the housing.

BRIEF DESCRIPTION OF DRAWINGS

Further details, features, and advantages of embodiments of the invention will become apparent from the following description of exemplary embodiments with reference to the accompanying drawings. In the drawings:

FIG. 4A-D: are representations of the various components of a feed-through and sealing arrangement according to the invention, wherein FIG. 6A-D: are representations of the various components of a feed-through and sealing arrangement according to the invention, wherein

DESCRIPTION OF AN EMBODIMENT

A compressor for refrigerant has a mechanical part filled with mainly gaseous refrigerant and oil and also being referred to as a ¾ pump. This part should be sealed against the electronic part the inverter—which must be kept free from any such working media to avoid damage to the electronic components of the printed circuit board caused by refrigerant and/or oil.

A glass-metal seal is mostly used as the standard for the electrical feed-through. This is sealed against the compressor housing either by means of a metal bead seal or by means of an elastomer seal. A plastic sleeve or elastomer seals serve for electrical insulation against the refrigerant. The elastomer or plastic sleeve covers the open metal surfaces in the compressor.

Figure 1:
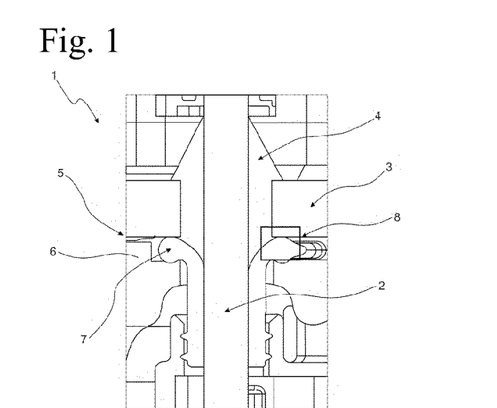
FIG. 1: is a feed-through and sealing arrangement of an electrical connection fed through a housing wall of an electric motor or another electric device, prior art.

FIG. 1 shows a feed-through and sealing arrangement 1 of an electrical connection fed through a housing wall of a compressor, as is known from the prior art. It comprises a terminal pin 2 made of electrically conductive material, which is fed through a metal plate 3. This is enclosed by a glass insulation 4 in the region of the metal plate 3 and in the adjoining regions above and below the metal plate 3. The main sealing function of the mechanical part of the compressor, which is filled with refrigerant and oil, with respect to the electronic part is ensured by a metal seal coated with acrylonitrile butadiene rubber (NBR) with a half-bead shape—hereinafter referred to as plate seal 5—which is positioned between the metal plate 3 with the fed-through terminal pin 2 and a plate support surface on the compressor housing 6. The open metal surfaces of the terminal pin 2 in the compressor are covered by means of a terminal pin cover 7, which is designed in the form of a cylindrical plastic sleeve with external thread for a screw connection and serves for electrical insulation against the refrigerant.

Here, the relatively high complexity is a disadvantage, since two components are required for sealing the metal plate and/or the terminal pin plate and the terminal pin cover. This involves a high level of assembly work. In addition, this may result in formation of non-sealing regions 8.

Figure 2:
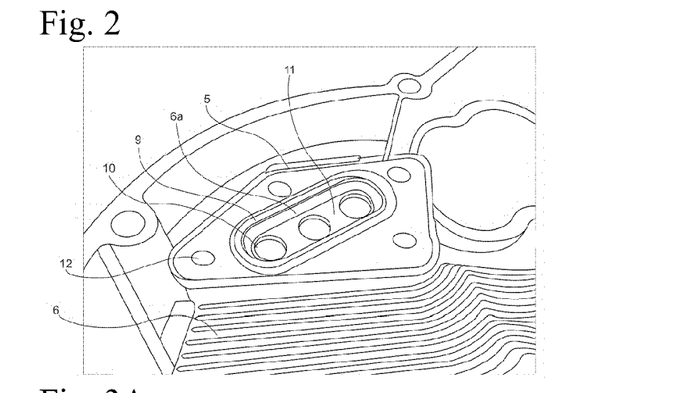
FIG. 2: is a representation of a region of a motor housing with view of a metal bead seal and feed-through openings for electrical connections to be fed through the housing wall, prior art.

FIG. 2 shows the region of the compressor housing 6 with view of the plate seal 5, which is provided as a metal bead seal with an inner circumferential half-bead 9, and with view of three feed-through openings 10 in a wall 6a of the compressor housing 6, with electrical connections of a three-phase connector to be guided, as is likewise known from the prior art. All three feed-through openings 10 are located within an oval-edged recess 11 in the wall 6a of the compressor housing 6. In addition, a total of four fastening holes 12 for fastening screws or bolts (not shown in FIG. 2) are designed in the wall 6a of the compressor housing 6 outside the oval-edged recess 11 for fastening the metal plate (not shown) to the compressor housing 6.

Figure 3A:
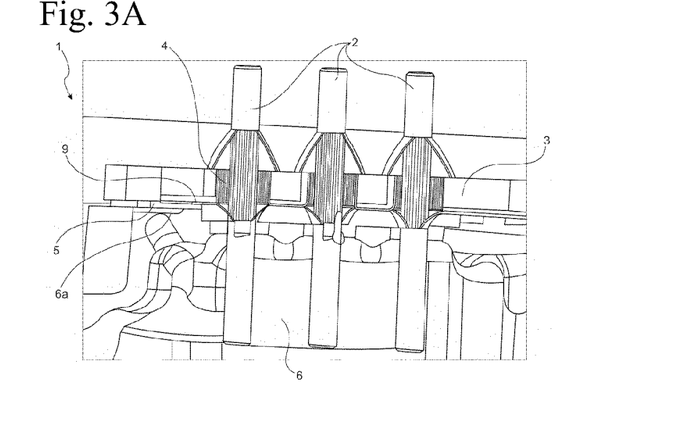
FIG. 3A: is a sectional view of a feed-through and sealing arrangement of a three-phase connector, prior art.
Figure 3B:
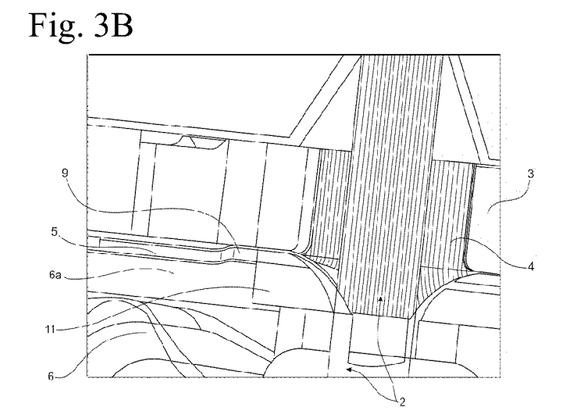
FIG. 3B: is a detailed view of the sectional view of the feed-through and sealing arrangement of the three-phase connector in the region of one of three terminal pins, prior art.

FIG. 3A shows a sectional view of the feed-through and sealing arrangement 1 of a corresponding three-phase connector according to the prior art in the assembled state. Such feed-through and sealing arrangement 1 comprises three terminal pins 2 made of electrically conductive material, which are passed through a metal plate 3. A glass insulation 4 encloses each of the terminal pins 2 in the region of the metal plate 3 and in the adjoining regions above and below the metal plate 3. The main sealing function of the mechanical part of the compressor with respect to the electronic part is ensured by a metal seal coated with acrylonitrile butadiene rubber (NBR) with a half-bead shape hereinafter referred to as plate seal 5—which is positioned between the metal plate 3, into which the terminal pins are inserted, and a plate support surface on a wall 6a of the compressor housing 6. Here, the plate seal 5 is designed with a circumferential half-bead 9. FIG. 3B shows a detailed view of the sectional view of the feed-through and sealing arrangement of the three-phase connector in the region of one of the three terminal pins 2 shown in FIG. 3A, which is enclosed by the glass insulation 4 in the region of the feed-through through the metal plate 3. The region of the feed-through through the metal plate 3 is located within the oval-edged recess 11. FIG. 3B also allows a more detailed view of the circumferential half-bead 9 of the plate seal 5, which is positioned between the metal plate 3 connected by means of the terminal pins 2 and the plate support surface on a wall 6a of the compressor housing 6.

As already mentioned, according to the prior art, the main sealing function of the mechanical part of the compressor, which is filled with liquid refrigerant and oil, is secured against the electronic part—the inverter—which is to be kept dry, by means of an NBR-coated metal seal with a half-bead shape, which is placed between the terminal pin plate 3 and the plate support surface on the housing 6 of the motor. The half-bead 9, as being a sealing bead, is pressed by the fastening screws or bolts by fastening the terminal pin plate 3 and thus creates a tight connection of the mechanical and the electronic parts.

In addition to the aforementioned disadvantages, the various components also have different expansion coefficients, which result in different technical behavior in temperature stability tests due to different temperature loads. Thus, the metal plate for electrical feed-through is usually made of steel. The material for the metal pin cover is usually plastic or elastomer. In contrast, the motor housing of the compressor is made of aluminum. In particular, expansion and shrinkage of the seal at changing temperatures—in some test cycles with 125° C. as the maximum temperature and −40° C. as the lowest temperature—stress the entire assembly of the electrical feed-through, which results in reduction of the residual torque of the fastening screws, which may result in the fastening screws getting lost, which in the worst case may result in leakage in the region of the electrical feed-through.

Figure 4A:
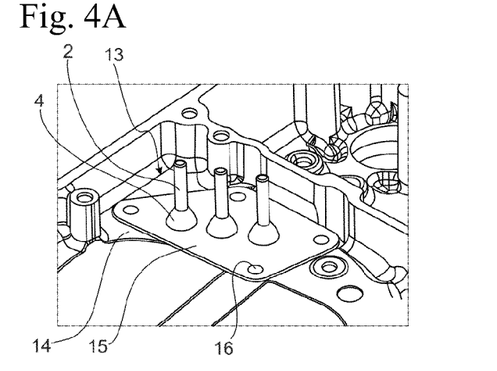
FIG. 4A: is a plan view of an integrated terminal pin plate.
Figure 4B:
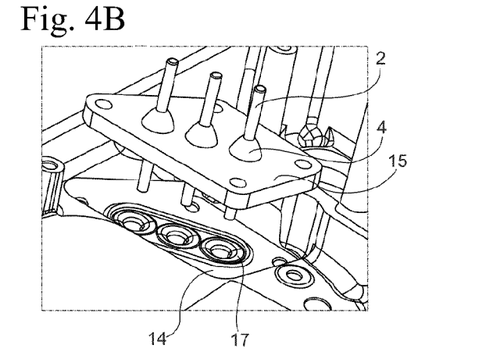
FIG. 4B: is a perspective view with view of the terminal pin plate and a combined sealing part placed on a housing before installation of the terminal pin plate.

FIGS. 4A-D represent various components of a feed-through and sealing arrangement 13 according to the invention for a three-phase connector. In this case, FIG. 4A shows a plan view of a terminal pin plate 15 placed on a housing 14 of a motor and having three terminal pins 2 arranged in rows and each enclosed by a glass insulation 4 in the region of the feed-through through the terminal pin plate 15 and/or metal plate 15. The terminal pin plate 15 is trapezoidally shaped and has four fastening holes 16 for fastening to the housing 14. FIG. 4B shows a perspective view with view of the terminal pin plate 15 with the terminal pins 2 fastened therein and provided with the glass insulation 4, and a combined sealing part 17 placed on the housing 14 of the motor before the installation of the terminal pin plate 15.

Figure 4C:
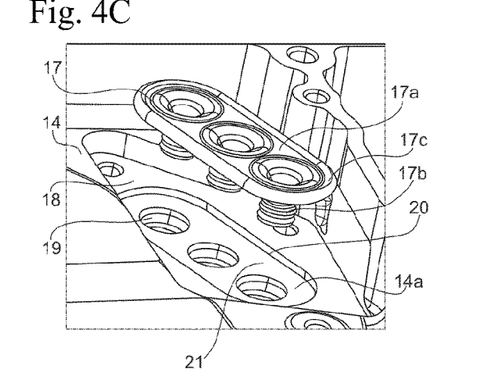
FIG. 4C: is a perspective view with view of a support surface of the housing and the combined sealing part as a single-material component before the sealant part is placed on and/or installed into the housing.
Figure 4D:
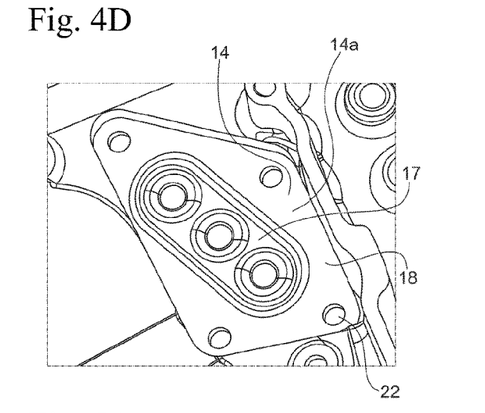
FIG. 4D: is a plan view of the combined sealing part placed on/inserted into the housing.

FIG. 4C contains a perspective view with view of a plate support surface 18 of the housing 14 with three feed-through openings 19 and with view of the combined sealing part 17, which is implemented in the form of a single-material component, before placing and/or installing the combined sealing part 17 on and/or into the housing 14. The three feed-through openings 19 are located within an oval-edged recess 20 in a wall 14a of the compressor housing 14, which is surrounded by the plate support surface 18. In the combined sealing part 17, a flat plate sealing region 17a, which is provided for being placed between the metal plate 15 (cf. FIG. 4A) and a sealing support surface and/or sealing surface 21 within the recess 20 on the housing 14, and three terminal pin covers 17b, which are each designed in the form of a cylindrical plastic sleeve with a frontal opening surrounded by the flat plate sealing region 17a, are connected to one another. Here, the terminal pin covers 17b are provided for being inserted into the three feed-through openings 19 of the housing wall 14a when feeding-through the three terminal pins of the terminal pin plate through the housing wall 14a. The combined sealing part 17 has an additional oval sealing ring 17c at the outer edge of the flat plate sealing region 17a, which encloses the flat plate sealing region 17a as a circumferential sealing cord. Finally, FIG. 4D shows a plan view of the combined sealing part 17 placed on the wall 14a of the housing 14/inserted into the housing 14, and of the plate support surface 18 with four fastening holes 22, which correspond to the four fastening holes of the terminal pin plate (cf. FIG. 4A).

Figure 5A:
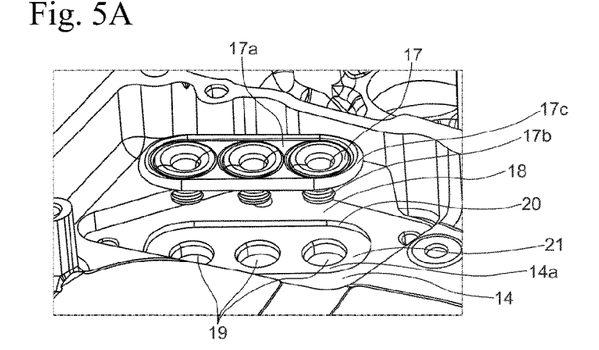
FIG. 5A: is a perspective representation with view of the region of the housing of the engine to be sealed and the combined sealing part as a single-material component before the sealing part is placed on and/or installed into the housing.

Similar to FIG. 4C, FIG. 5A shows a perspective representation with view of the region of the housing 14 of the motor to be sealed against an electronic part (inverter), as well as of the combined sealing part 17 for a three-phase connector, which is designed as a single-material component, before placing and/or installing the sealing part 17 on/into the housing 14. Three feed-through openings 19 are located within an oval-edged recess 20, which is surrounded by the plate support surface 18. In the combined sealing part 17, a flat plate sealing region 17a, which is provided for being placed between the metal plate 15 (cf. FIG. 4A) and a sealing support surface and/or sealing surface 21 within the recess 20 on the housing 14, and three terminal pin covers 17b, which are each designed in the form of a cylindrical plastic sleeve with a frontal opening surrounded by the flat plate sealing region 17a, are connected to one another. Here, the terminal pin covers 17b are provided for being inserted into the three feed-through openings 19 of the housing wall 14a when feeding-through three terminal pins of a terminal pin plate through the housing wall 14a. The combined sealing part 17 has an additional oval sealing ring 17c at the outer edge of the flat plate sealing region 17a, which encloses the flat plate sealing region 17a as a circumferential sealing cord.

Figure 5B:
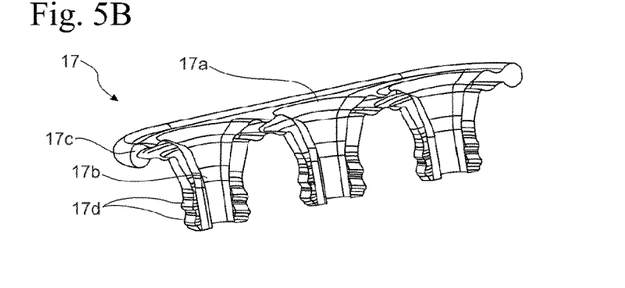
FIG. 5B: is a detailed partial sectional representation of the combined sealing part.

FIG. 5B shows a more detailed partial sectional representation of the combined sealing part 17, wherein all regions, i.e. the upper region in which the flat plate sealing region 17a and the oval sealing ring 17c are located, and the three cylindrically and/or hollow-cylindrically shaped terminal pin covers 17b are formed together from the same elastomeric component. At each cylindrical terminal pin cover 17b, two beadings 17d arranged on top of each other and extending around the circumference of the cylinder jacket are formed as projecting thickenings of the cylinder jacket in the region at the lower end of the cylinder jacket remote from the plate sealing region 17a.

Figure 6A:
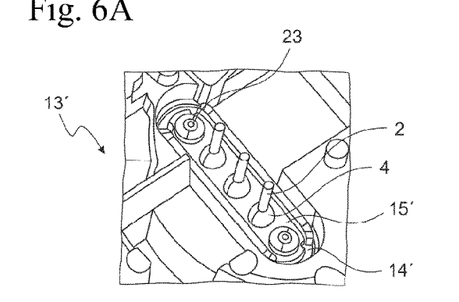
FIG. 6A: is a plan view of an integrated terminal pin plate.

FIGS. 6A-D also represent various components of a feed-through and sealing arrangement 13' for a three-phase connector according to an alternative embodiment. In this case, FIG. 6A shows a plan view of a terminal pin plate 15' placed on a housing 14' of a motor and having three terminal pins 2 arranged in rows and each surrounded by a glass insulation 4 in the region of the feed-through through the terminal pin plate 15' and/or metal plate 15'. FIG. 6A shows a simplified form of the terminal pin plate 15', having an elongated oval outer contour and having two fastening elements 23 in the region of the opposite ends of the long side of the terminal pin plate 15' in order to fasten the terminal pin plate 15' in corresponding fastening holes on the housing 14'. Usually, two screws are sufficient for fastening the terminal pin plate 15' to the plate support surface.

Figure 6B:
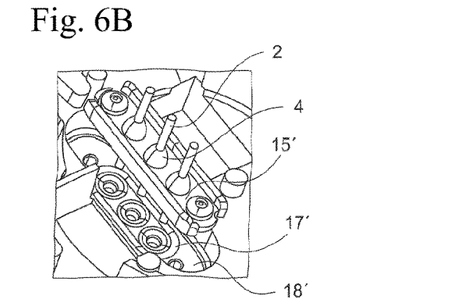
FIG. 6B: is a perspective view with view of the terminal pin plate and a combined sealing part placed on a housing before installation of the terminal pin plate.

FIG. 6B shows a perspective view with view of the terminal pin plate 15' with the terminal pins 2 fastened therein and provided with the glass insulation 4, and a combined sealing part 17' placed on the housing 14' of the motor (see FIG. 6A) before placing the terminal pin plate 15' on the plate support surface 18'.

Figure 6C:
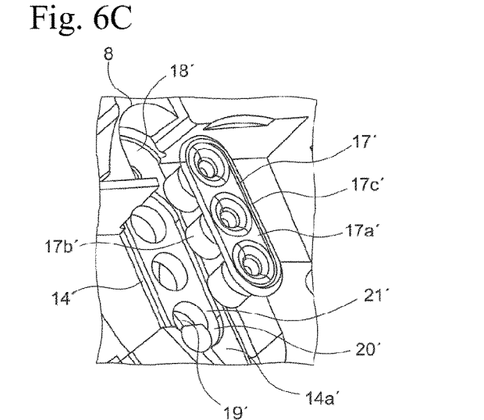
FIG. 6C: is a perspective view with view of a support surface of the housing and the combined sealing part as a dual-material component before the sealant part is placed on and/or installed into the housing.

FIG. 6C contains a perspective view with view of a plate support surface 18' of the housing 14' with three feed-through openings 19' and with view of the combined sealing part 17', which is implemented in the form of a dual-material component, before placing and/or installing the combined sealing part 17' on and/or into the housing 14'. The three feed-through openings 19' are located within an oval-edged recess 20' in a wall 14a' of the compressor housing 14', which is surrounded by the plate support surface 18'. In the combined sealing part 17', a flat plate sealing region 17a', which is provided for being placed between the metal plate 15' and a sealing support surface and/or sealing surface 21' within the recess 20' on the housing 14', and three terminal pin covers 17b', which are each designed in the form of a cylindrical plastic sleeve with a frontal opening surrounded by the flat plate sealing region 17a', are connected to one another. Here, the terminal pin covers 17b' are provided for being inserted into the three feed-through openings 19' of the housing wall 14a' when feeding-through the three terminal pins of the terminal pin plate through the housing wall 14a'. The combined sealing part 17' has an additional oval sealing ring 17c' at the outer edge of the flat plate sealing region 17a', which encloses the flat plate sealing region 17a' as a circumferential sealing cord.

Figure 6D:
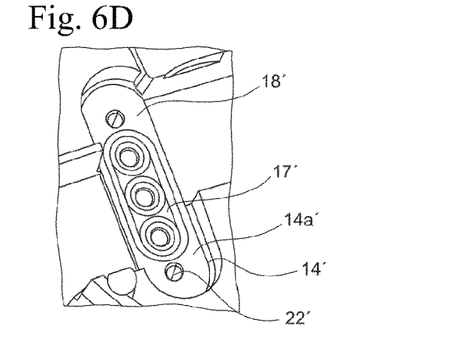
FIG. 6D: is a plan view of the combined sealing part placed on/inserted into the housing.

Finally, FIG. 6D shows a plan view of the combined sealing part 17' placed on the wall 14a' of the housing 14'/inserted into the housing 14', and of the plate support surface 18' with two fastening holes 22', which correspond to the two fastening elements 23 of the terminal pin plate (cf. FIG. 6A).

Figure 7A:
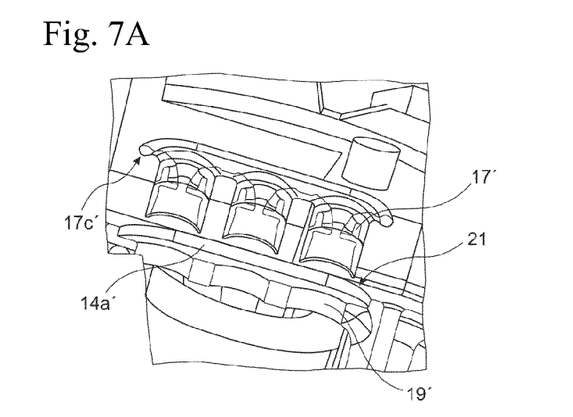
FIG. 7A: is a partial sectional representation of a combined sealing part as a dual-material component and of corresponding feed-through openings of the housing wall before inserting the sealing part.
Figure 7B:
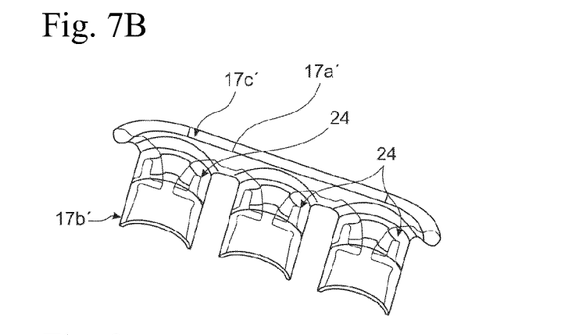
FIG. 7B: is a detailed partial sectional representation of the combined sealing part.

FIG. 7A shows a partial sectional representation of a combined sealing part 17' as dual-material component and of corresponding feed-through openings 19' of the housing wall 14a' before inserting the combined sealing part 17', which has an oval sealing ring 17c' in the upper region. The corresponding feed-through openings 19' are surrounded by the sealing surface 21'. FIG. 7B shows a more detailed partial sectional representation of the combined sealing part 17'. The upper region, in which the flat plate sealing region 17a' and the oval sealing ring 17c' are located, is formed from an elastomeric component, while the terminal pin covers 17b' are formed from a hard component. A bonded connection 24 exists between the elastomeric component and the hard component.

Figure 8:
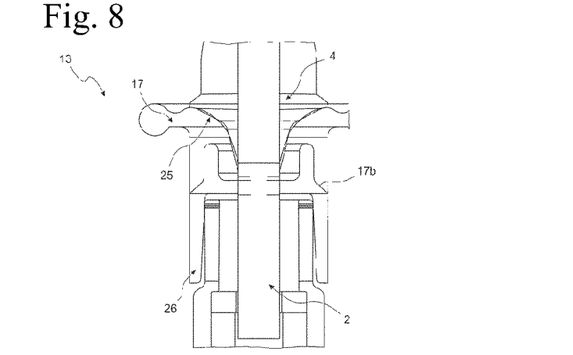
FIG. 8: is a detailed sectional representation of a part of a feed-through and sealing arrangement in the region of a single terminal pin.

FIG. 8 shows a detailed sectional representation of a part of the feed-through and sealing arrangement 13' in the region of an individual terminal pin 2 and with a combined sealing part 17' in the embodiment as dual-material component. Here, the glass insulation 4 enclosing the terminal pin in the region of the feed-through opening contacts the elastomeric part of the combined sealing part 17' in a sealing region 25. The region of the terminal pin cover 17b', in particular the so-called concealer 26, i.e. the part of the cylindrical terminal pin cover 17b' being intended to be pushed over an electrical interface of the motor and/or electric device like a cap, is formed from a hard component.

Figure 9:
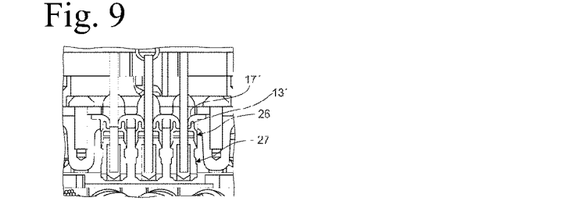
FIG. 9: is a sectional representation of the region in a compressor in which the feed-through and sealing arrangement is installed.

FIG. 9 shows a sectional representation of the region in a compressor in which a feed-through and sealing arrangement 13' is installed with a corresponding combined sealing part 17' made from a dual-material component for a three-phase connector. The design of the combined sealing part as a dual-material component provides sufficient stability to the three concealers 26 so that the concealer shells can be pushed over the motor interface 27 without folding.

LIST OF REFERENCE NUMERALS 1 feed-through and sealing arrangement, prior art
2 terminal pin
3 terminal pin plate, metal plate
4 glass insulation
5 plate seal
6 housing, compressor housing,
6a wall of housing, wall of compressor housing
7 terminal pin cover
8 non-sealing regions
9 half-bead
10 feed-through openings in the wall of the compressor housing
11 oval-edged recess
12 mounting holes
13 feed-through and sealing arrangement
13' feed-through and sealing arrangement
14 housing, compressor housing
14a wall of housing, wall of compressor housing, housing wall
14' housing, compressor housing
14a' wall of housing, wall of compressor housing, housing wall
15 terminal pin plate, metal plate
15' terminal pin plate, metal plate
16 mounting holes
17 combined sealing part
17a plate sealing region
17b terminal pin cover
17c oval sealing ring
17d circumferential beading
17' combined sealing part
17a' plate sealing region
17b' terminal pin cover
17c' oval sealing ring
18 plate support surface
18' plate support surface
19 feed-through openings
19' feed-through openings
20 recess
20' recess
21 sealing surface
21' sealing surface
22 mounting holes
22' mounting holes
23 mounting elements
24 bonded connection
25 sealing region
26 concealer
27 motor interface

The invention claimed is:

1. A feed-through and sealing arrangement of an electrical connection fed through a housing wall of an electric motor or another electric device, the feed-through and sealing arrangement comprising:
   a terminal pin plate in the form of a metal plate with at least one feed-through opening through which a terminal pin made of electrically conductive material is fed through and electrically insulated from the metal plate by a glass insulation extending through the at least one feed-through opening and enclosing the terminal pin in a region of the at least one feed-through opening;
   a plate support surface for the metal plate on the housing wall;
   a sealing surface on the housing wall surrounded by the plate support surface for the metal plate, the at least one feed-through opening surrounded by the sealing surface for feed-through of the terminal pin through the housing wall; and
   a combined sealing part, in which a flat plate sealing region placed on the housing between the metal plate and the sealing surface and at least one terminal pin cover, which is a cylindrical plastic or an elastomer sleeve having a frontal opening surrounded by the flat plate sealing region, are connected to each other, wherein the at least one terminal pin cover is inserted into the at least one feed-through opening of the housing wall when feeding-through the terminal pin through the housing wall.

2. The feed-through and sealing arrangement according to claim 1, wherein the feed-through and sealing arrangement has three terminal pins and has, for the terminal pins, three feed-through openings in the metal wall, three feed-through openings in the housing wall, and a combined sealing part with three terminal pin covers.

3. The feed-through and sealing arrangement according to claim 2, wherein an outer edge of the flat plate sealing region has an oval shape.

4. The feed-through and sealing arrangement according to claim 3, wherein the plate support surface for the metal plate in the region surrounding the feed-through openings and forming the plate support surface for the flat plate sealing region of the combined sealing part has an oval recess corresponding to the oval shape of the flat plate sealing region.

5. The feed-through and sealing arrangement according to claim 2, wherein the combined sealing part has an oval sealing ring at an outer edge of the flat plate sealing region, which encloses the flat plate sealing region as a circumferential sealing cord.

6. The feed-through and sealing arrangement according to claim 2, wherein the combined sealing part is formed as a single-material component from an elastomer.

7. The feed-through and sealing arrangement according to claim 2, wherein the combined sealing part is a dual-material component, which consists of a soft component comprising the plate sealing region and a hard component in at least a part of the terminal pin covers.

8. The feed-through and sealing arrangement according to claim 7, wherein the hard component and the soft component are joined together by an adhesive bond or by vulcanization.

9. The feed-through and sealing arrangement according to claim 7, wherein the soft component consists of ethylene propylene diene monomer rubber (EPDM).

10. The feed-through and sealing arrangement according to claim 7, wherein the hard component consists of a polyamide with a glass fiber reinforcement.

* * * * *